(12) United States Patent
Johnson

(10) Patent No.: US 8,788,427 B2
(45) Date of Patent: Jul. 22, 2014

(54) LIMITING DATA EXPOSURE IN AUTHENTICATED MULTI-SYSTEM TRANSACTIONS

(75) Inventor: Doug Johnson, Coquitlam (CA)

(73) Assignee: Active Network, LLC DE (US)

( * ) Notice: Subject to any disclaimer, the term of this patent is extended or adjusted under 35 U.S.C. 154(b) by 0 days.

(21) Appl. No.: 13/475,494

(22) Filed: May 18, 2012

(65) Prior Publication Data

US 2013/0311381 A1 Nov. 21, 2013

(51) Int. Cl.
*G06Q 20/00* (2012.01)
*G06F 21/00* (2013.01)
*H04L 9/32* (2006.01)

(52) U.S. Cl.
USPC .............................. 705/67; 705/53; 713/173

(58) Field of Classification Search
None
See application file for complete search history.

(56) References Cited

U.S. PATENT DOCUMENTS

2005/0216421 A1* 9/2005 Barry et al. ..................... 705/64
2008/0077796 A1* 3/2008 Lund et al. .................... 713/173
2009/0117883 A1* 5/2009 Coffing et al. ............. 455/414.1
2011/0276493 A1* 11/2011 Graham et al. ................. 705/53
2012/0072723 A1* 3/2012 Orsini et al. .................. 713/165
2012/0116976 A1* 5/2012 Hammad et al. ................ 705/67

OTHER PUBLICATIONS https://stripe.com/ ; STRIPE, printout of website pages on Sep. 11, 2012; 26 pages.

* cited by examiner

*Primary Examiner* — Alexander Kalinowski
*Assistant Examiner* — Murali Dega
(74) *Attorney, Agent, or Firm* — Stetina Brunda Garred & Brucker

(57) ABSTRACT

The limiting of data exposure in authenticated multi-system transactions is disclosed. A client system authenticates and requests secured data and unsecured data with an initial system. The initial system transmits to an external system a token request that corresponds to the request for the secured data. A token is generated and passed to the initial system, which relays the same to the client system. The client system uses the token to access the secured data on the external system, while also retrieving the unsecured data on the initial system. The initial system thus does not have access to the secured data, while the request therefor is known.

11 Claims, 7 Drawing Sheets

47 —— <login-credentials>
    48 —— <username>Alex</username>
    50 —— <password>pass</password>
47 —— <login-credentials>

*FIG. 6A*

GET /creditinformation.html HTTPS/1.1
Host: www.bigco.example

*FIG. 6B*

<request-token>
55 —— <application-name>Alex</application-name>
56 —— <application-password pass</application-password>
58 —— <dataset>SavedWalledID1<dataset>
</request-token>

*FIG. 6C*

<token>9b0520e0-6d63-11e1-b0c4-0800200c9a66</token>

*FIG. 6D*

59 —— <account-info>
    60 —— <name>John Smith</name>
    61 —— <booking-start-date>2012-04-12</booking-start-date>
    62 —— <booking-end-date>2012-04-14</booking-end-date>
    64 —— <placeholder-for-wallet>9b0520e0-6d63-11e1-b0c4-0800200c9a66</placeholder-for-wallet>
    </account-info>

*FIG. 6E*

```
        POST /creditinformation.html HTTP/1.1
        Host: www.ess.example
68 ──── <account-request>
  70 ──── <user>Alex</name>
  72 ──── <token>9b0520e0-6d63-11e1-b0c4-0800200c9a66</token>
        </account-info>
```

```
<account-response>
75 ──── <credit-card-number>45000000000001111</credit-card-number>
</account-response>
```

LIMITING DATA EXPOSURE IN AUTHENTICATED MULTI-SYSTEM TRANSACTIONS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to data security for electronic commerce, and more particularly, to limiting data exposure in authenticated multi-system transactions.

2. Related Art

All manner of transactions are conducted with computers connected to high-speed data transfer networks such as the Internet. In the broadest sense, a transaction involves a requestor initiating a request with a provider, with that provider responding to that request to the requestor. More particularly in the commercial context, also referred to as E-commerce, there may be a customer who requests to purchase an item sold by a merchant, i.e., to deliver the requested item in exchange for payment by the customer therefor. Such online shopping services have proved to be popular and profitable sales outlets, due in part to its convenience, ready availability of information for purchase decision-making, lower prices, and greater variety in the selection of available products. Besides the conventional transactions involving the sale of goods, transactions involving services, such as registering for overnight accommodations and other travel services, or for events such as athletic competitions, conventions, and the like are also routinely handled online.

Generally, customers visit the sellers' websites using a computer having a connection to the Internet as well as a web browser application. The e-commerce sites have visual representations of the products and/or services being sold, along with descriptions therefor. After selecting the desired items and storing them in a "shopping cart," the customer exchanges payment information with the merchant website. Some information pertaining to the particular customer, including name, address, telephone number, and e-mail address, may be stored by the e-commerce site in individual accounts, which may be accessed following a login procedure. Various electronic payment modalities are known in the art, including credit cards, debit cards, gift cards, postal money orders, and personal checks, as well as those involving third party processors such as PayPal®. Upon successfully rendering payment to the seller with these modalities, the merchant ships the ordered product(s) or performs the requested service(s).

The particular implementations of e-commerce sites vary according to the needs and budgetary restrictions of the business. The largest typically handle all aspects of a transaction, from account setup, inventory and other tracking systems, to payment. In the event registration site example, a single e-commerce site may provide the registration functions and the payment functions. Integrating all such functions is typically justified when transaction volumes are large enough to justify the significant expenses of purchasing and maintaining the necessary information technology (IT) infrastructure including secured servers, server-side encryption technologies, connections to credit card processing networks, and the like. However, for smaller e-commerce sites, these additional costs associated with internal payment processing may be prohibitively expensive, especially when transaction volumes are much lower. To the extent that personal account number (PAN) data such as bank account numbers, credit card numbers, expiration dates, and security codes from customers are handled, there must be systems and procedures in place for compliance with the Payment Card Industry (PCI) standards. Non-compliance can subject the merchant to fines, legal action, and exclusion from credit card processing networks.

To avoid difficulties associated with infrastructure setup and continual PCI compliance, such smaller e-commerce sites typically outsource payment processing to third parties. Aside from payment functions, different e-commerce services may necessitate that certain functions be handled by other systems and entities independent thereof. The receipt and processing of sensitive information, such as the aforementioned PAN data, are the functions that are typically delegated. However, one of the challenges associated with such e-commerce site implementations is the preference for presenting a unified interface and user experience notwithstanding the employment of third party services. Accordingly, a primary service site to which the user logs in or authenticates and accesses information and functions particular thereto (which may involve less-sensitive information), may also be required to request from the user the sensitive PAN data for passing to the third party service site. This unfortunately necessitates the primary service site to adopt the same security policies as the third party service site, leaving the primary service site in not much more of an advantageous position than had it also implemented the functionality otherwise provided by the third party service site.

There is thus a need for improved methods and systems for e-commerce site implementations, particularly those that limit data exposure in authenticated multi-system transactions.

BRIEF SUMMARY

The present disclosure contemplates limiting the exposure of secured data in an authenticated transaction over multiple systems. Generally, a single-use token is generated by an external system rather than an initial system with which the user first authenticates. That single-use token is associated with the secured data prior to a request therefor, and is expressly limited thereto. The single-use token is understood to adequately protect the secured data for payment card industry (PCI) and other data security standards, and the external system need not have prior knowledge of any requesting client system while retaining end-to-end trust that is auditable at each point in the request-response transaction.

One embodiment contemplates a method for limiting exposure of the secured data in an authenticated transaction over multiple systems. The method may include transmitting a transaction request from the client system to an initial system. The transaction request may include a first request for the secured data stored on an external system and a second request for unsecured data stored on the initial system. Then, the method may include receiving the token from the initial system. The token may be generated by the external system in response to the token request from the initial system that corresponds to the first request for the secured data in the transmitted transaction request and passed to the initial system. The method may also include transmitting the token to the external system for validation thereby. Furthermore, there may be a step of receiving the secured data subject of the first request upon a validation of the token.

Another method includes a step of receiving a transaction request from an authenticated user of the client system on the initial system. Thereafter, the method may include deriving a first request for the secured data stored on an external system from the transaction request. Additionally, a second request for unsecured data stored on the initial system may also be derived from the transaction request. There may be a step of transmitting a token request that corresponds to the first request for the secured data to the external system. This external system may be configured to generate the token that is associated with the token request. The method may further include receiving the generated token from the external system, on the initial system. Then, the method may proceed to transmitting the token and the requested unsecured data stored on the initial system to the client system, from the initial system. The token may be presentable by the client system to the external system to retrieve the secured data stored on the external system upon validation of the token thereby.

Yet another method contemplates limiting exposure of the secured data stored on the external system in a transaction first authenticated with the client system by the initial system. The method may include receiving a token request on the external system that originates from the initial system and corresponds to the transaction. The transaction may include a first request for the secured data stored on the external system and a second request for unsecured data stored on the initial system. There may also be a step of generating the token in response to the token request. The token may be specific to the first request for the secured data stored on the external system. The method may further include transmitting the token to the initial system for passing to the client system. Thereafter, the method may continue with receiving an authentication request from the client system. The authentication request may include the token, and may be related to the first request for the secured data. There may also be a step of transmitting the secured data responsive to the first request to the client system. This may occur upon validating the received authentication request and the token from the client system.

Certain other embodiments of the present disclosure contemplate respective computer-readable program storage media that each tangibly embodies one or more programs of instructions executable by a data processing device to perform each of the foregoing methods. The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIGS. 6A-6G are eXtensible Markup Language (XML) code snippets of example data being exchanged between the client system, the initial system, and the external system throughout the various methods of limiting exposure of secured data in an authenticated transaction; and FIG. 7 is an example output rendered on the client system including requested secured data and unsecured data.

Common reference numerals are used throughout the drawings and the detailed description to indicate the same elements.

DETAILED DESCRIPTION

The present disclosure contemplates limiting the exposure of data from systems that do not have a need therefor while conducting secured, authenticated transactions over multiple systems. The involvement of multiple systems is typical in managing user transaction requests, although a single, unified interface is presented to the user, including the initial authentication/login interface. In accordance with various embodiments, sensitive user data from a system other than the initial authenticating system can be provided to the user while remaining safeguarded from access on the original authenticating system. More particularly, the methods envision the sensitive user data not being transmitted to the user via the original authenticating system, thereby removing the same from compliance audits such as PCI-DSS (Payment Card Industry, Data Security Standard) mentioned above.

The detailed description set forth below in connection with the appended drawings is intended as a description of the several presently contemplated embodiments of the methods for limiting exposure of secured or otherwise sensitive user data. It is not intended to represent the only form in which the disclosed invention may be developed or utilized. The description sets forth the functions and features in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
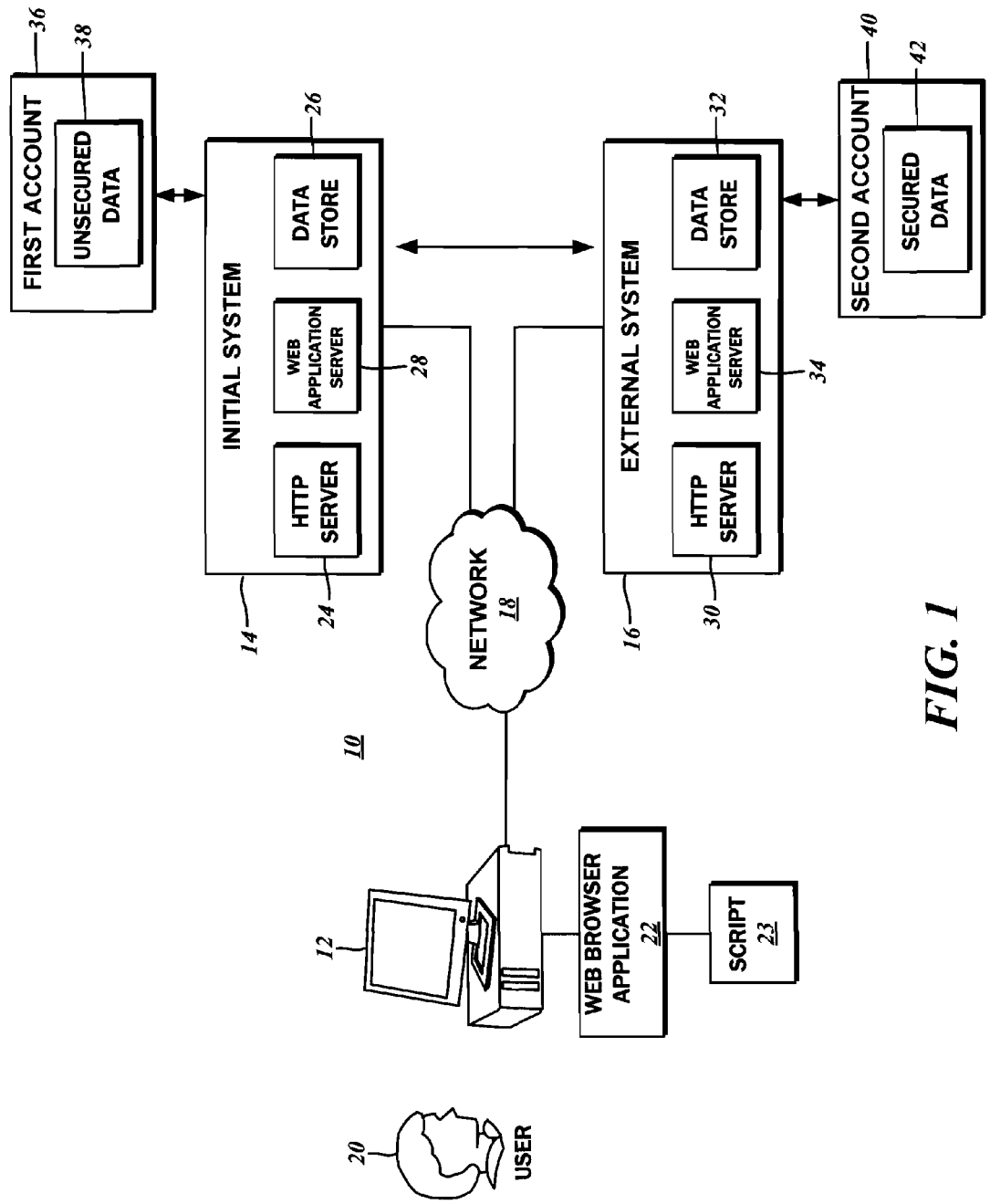
FIG. 1 is a block diagram illustrating the components utilized in the disclosed methods of limiting exposure of secured data in an authenticated transaction over multiple systems including a client system, an initial system, and an external system.

Referring now to the block diagram of FIG. 1, there is shown a networked computing environment 10 including a client system 12, an initial system 14, and an external system 16. Each of these systems is interconnected to each other via a network 18, which is understood to be any suitable high-speed wide area networked data communications modality. The security measures that are implemented on the various systems including those that relate to the methods of the present disclosure are particularly suitable for an open and publicly accessible network 18, with the most widely available example thereof being the Internet. Within this networked computing environment 10, various embodiments of the present disclosure may be implemented. The use of the terms initial, external, and client in relation to describing the various systems of the networked computing environment 10 are by way of example only and not of limitation. So long as the respective systems perform the steps of the methods in the manner contemplated, it is deemed to be within the scope of the present disclosure, notwithstanding the references to alternative descriptive terms.

In further detail, the client system 12 may be a conventional computer or data processing apparatus with a central processing unit, memory, various input and output devices such as keyboards, mice, and display units. Different variations of the computer system including desktops, laptops, tablets, smart phones and the like may be substituted, though any such device is understood to be connectible to the network 18 as noted above. Computer-executable software instructions of a web browser application 22, as well as those implementing the contemplated methods in conjunction with such web browser application 22, may be stored on the client system 12. The web browser application 22 is understood to communicate with the remote systems (including the initial system 14 and the external system 16) over the hypertext transfer protocol (HTTP) to request and receive data. However, for improved security, some data transfers may utilize the HTTP Secure (HTTPS) protocol, where a Secure Sockets Layer/Transport Layer Security (SSL/TLS) connection is utilized to encrypt all traffic between network nodes. Notwithstanding the specific reference to the HTTPS protocol, it will be recognized that any other suitable communications protocol may be utilized by the client system 12.

The initial system 14 and the external system 16 are likewise understood to be computers or data processing apparatuses that each includes a central processor, a memory, and input/output devices, loaded with computer-executable software instructions of web server and those that implement one or more of the disclosed methods. As shown in the block diagram of FIG. 1, the initial system includes an HTTP server 24, a data store 26, and a web application server 28 that executes certain functions corresponding to the steps of the methods. Similarly, the external system includes an HTTP server 30, a data store 32, and a web application server 34. The division of these components is for the purposes of illustrating their different functional blocks, and is not intended to be limiting. It will be recognized by those having ordinary skill in the art that there are numerous ways in which the initial system 14 and the external system 16 can be configured using different commercial, off-the-shelf hardware and software components.

It is understood that while the present disclosure refers to the web browser application 22, HTTP protocols for communication, HTTP servers 24, 30 and so forth, the implementation of the contemplated methods are not limited thereto. Any other suitable data communication protocols by which information can be exchanged between the aforementioned systems, whether currently known or unknown, may be substituted without departing from the scope of the present disclosure.

Broadly, the user 20 operates the client system 12, and specifically the web browser application 22, to log in to the initial system 14 over the network 18. The combined initial system 14 and external system 16 may provide an online service to the user 20 such as reserving accommodations, banking, shopping, and so forth. The disclosed methods do not depend upon the particular nature of the service provided, and are understood to be applicable to any online service.

For purposes of illustrating the methods as they would actually be implemented, by way of example only, the initial system 14 may be a hotel booking company website that registers guests for a property. Furthermore, the external system 16 may be a credit card processing/holding company website that is utilized by the hotel booking company website to guarantee payment. The user 20 may be a travel booking consultant having a first account 36 established on the initial system 14, with data 38 associated with that account being used to implement those aspects of the online service specific to the hotel booking logistics, for example. The data 38 can be stored on the data store 26, with read and write operations thereto being invoked through the application server 28.

In order to finalize the registration process for the guests specified under the first account 36, the user 20 may need to confirm the billing details to the online service that was previously entered by the individual guests. Such billing details may be stored as data 42 on the external system 16, under a second account 40. Similar to the initial system 14, the data 42 may be stored on the corresponding data store 32, with access thereto being provided via the application server 34. Because the billing data 42 on the external system 16 all relate to guests specified under the first account 36, there are understood to be links between the individual elements of the data 38 and of the data 42. One embodiment can utilize a unique token that is representative of a particular subset of the billing data 42 that pertains to a guest listed in the data 38, such that the presentation of the token is operative to reveal the underlying information.

Conventional privacy policies would dictate any user data to be properly secured against exposure. However, because the data 38 relating to the hotel booking logistics stored on the initial system 14 is by definition less sensitive than the data 42 relating to the credit card information stored on the external system 16, the data 38 may also be referred to as being unsecured, while the data 42 may be referred to as being secured. Generally, the various embodiments of the present disclosure contemplate that the secured data 42 is not visible to or otherwise accessible by the initial system 14, even though it would be transmitted to the client system 12 and accessible by the user 20 from the perspective of the overall online service.

The initial system 14 serves as the entry point for accessing the online service, and accordingly generates and presents to the client system 12 a unified and consistent interface thereto. Although the illustrated example shows that the initial system 14 stores the unsecured data 38, there may be other systems separate and apart from the initial system 14 that performs this function. Along these lines, only one external system 16 is shown for the purpose of illustrating the embodiments of the present disclosure. Additional external systems may store other sensitive data of the user 20 not stored by the external system 16. Such alternative configuration options have been omitted from the present disclosure for simplification purposes, but those skilled in the art will recognize the modifications to the methods that will enable the contemplated functionality in such alternative configurations. For the sake of simplicity and brevity, the following description will be limited to the exemplary methods in the context of the one initial system 14 and the one external system 16.

Figure 2:
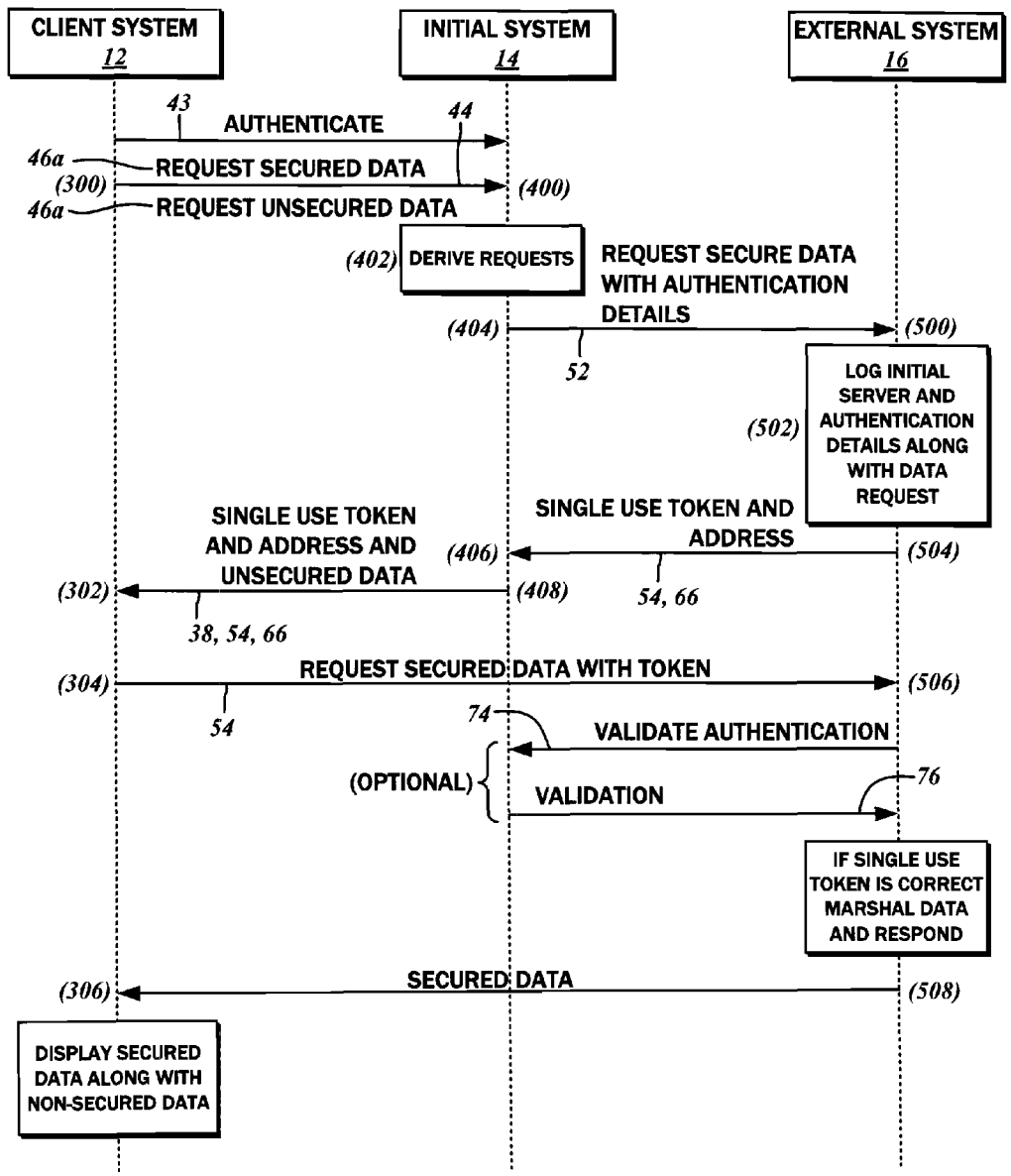
FIG. 2 is a data sequence diagram of a first embodiment of the method where no further validation between the external system and the initial system occurs once the token is validated by the external system.
Figure 3:
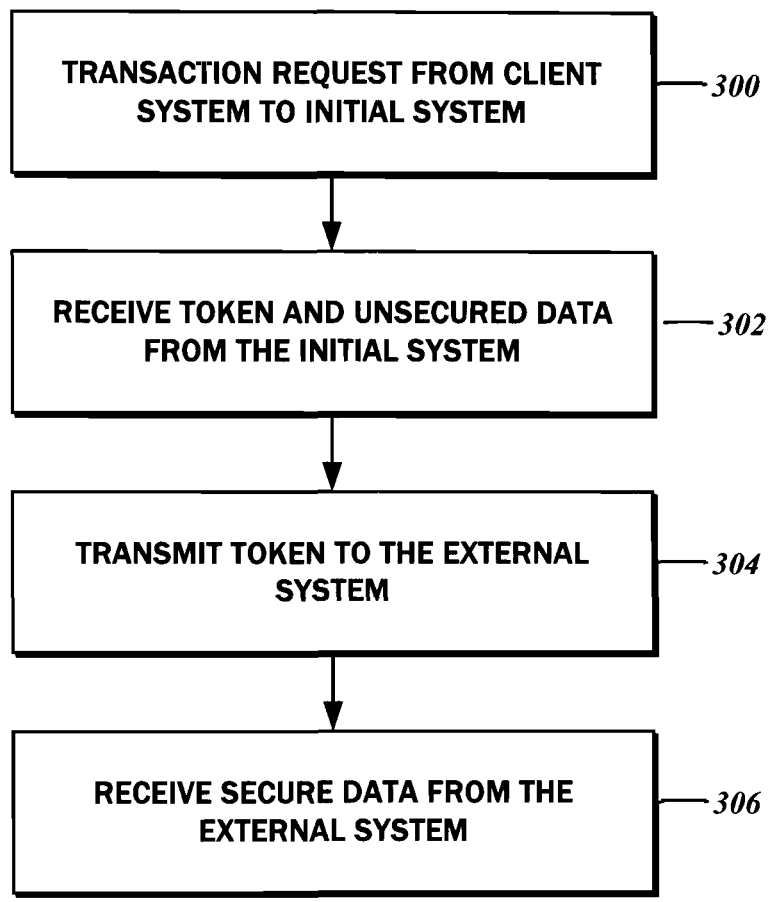
FIG. 3 is a flowchart of one contemplated embodiment of a method of limiting exposure of secured data in an authenticated transaction as may proceed on the client system.
Figure 4:
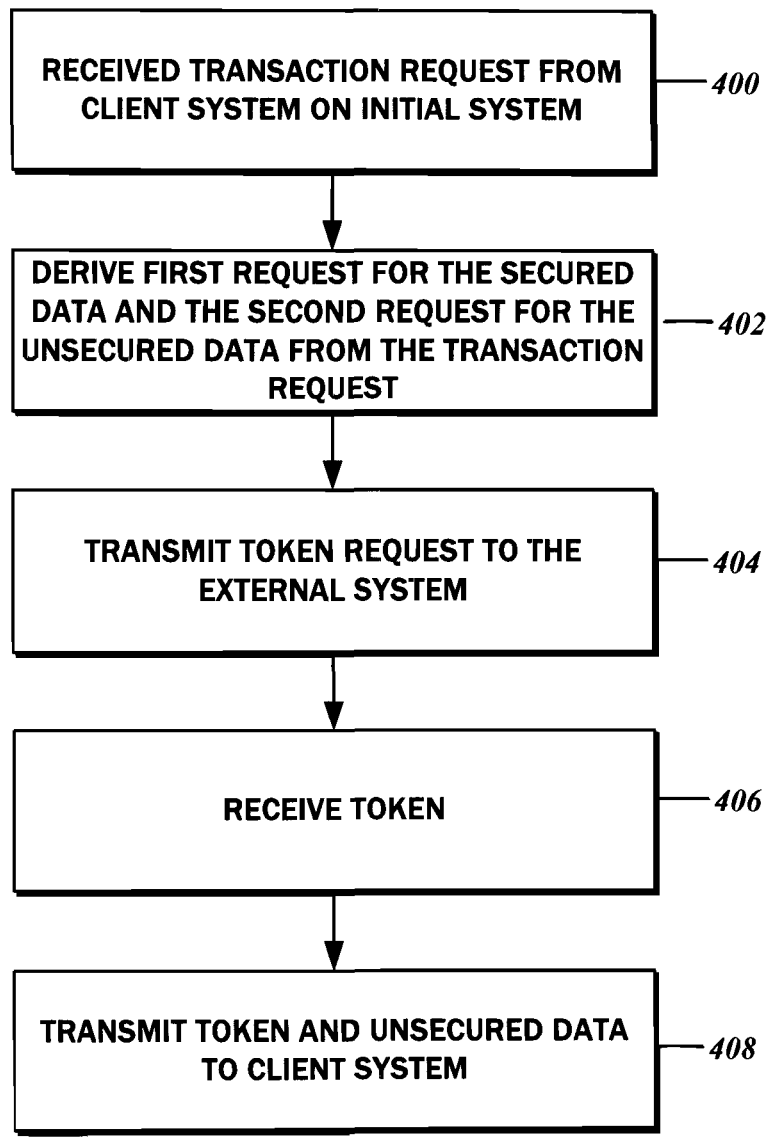
FIG. 4 is a flowchart of another embodiment of the method as may proceed on the initial system.
Figure 5:
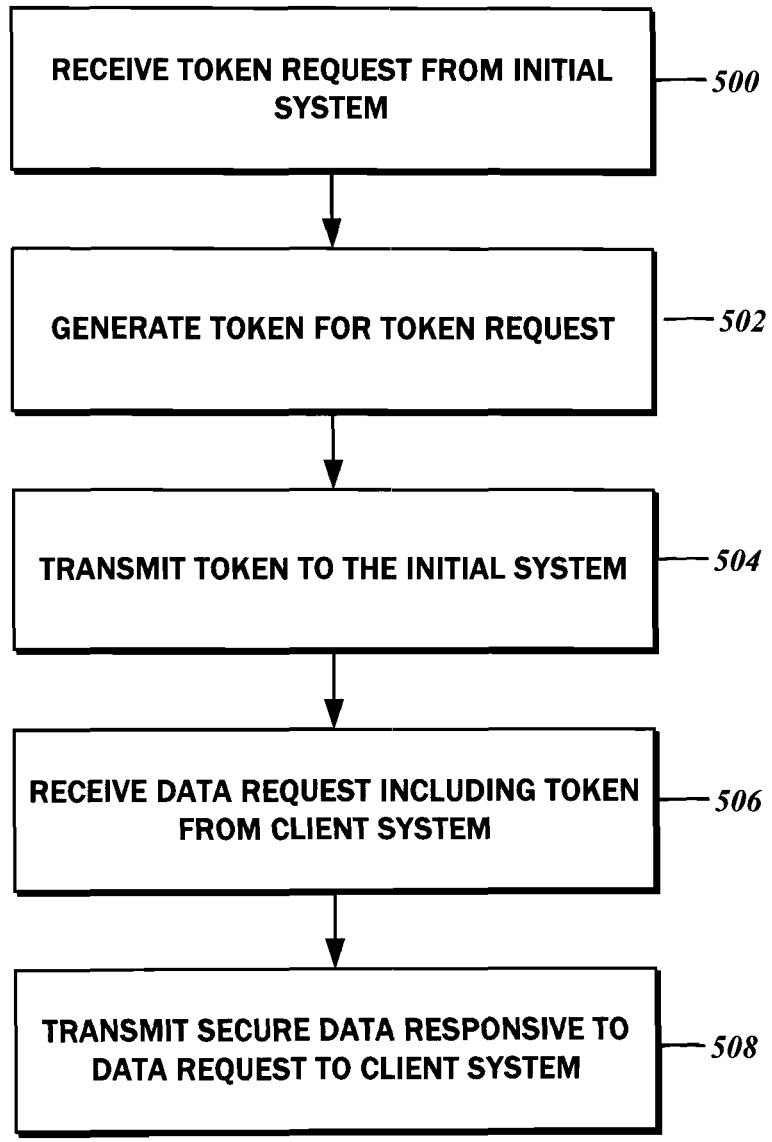
FIG. 5 is a flowchart of yet another embodiment of the method as may proceed on the external system.

In the context of the above-described networked computing environment 10, several methods for limiting exposure of secured data 42 in an authenticated transaction over multiple systems (the client system 12, the initial system 14, and the external system 16) will be described. The overall operation of the various systems and the data exchanged between them is best illustrated in a data sequence diagram of FIG. 2. However, one embodiment of the method from the perspective of the client system 12 is shown in the flowchart of FIG. 3, another embodiment of the method from the perspective of the initial system 14 is shown in the flowchart of FIG. 4, and an embodiment of the method from the perspective of the external system 16 is shown in the flowchart of FIG. 5. The following discussion will make reference to each of these flowcharts and the data sequence diagram.

With further reference to the flowchart of FIG. 3, there is a step 300 of transmitting a transaction request 44 from the client system 12 to the initial system 14. The transaction request 44 may be comprised of a first request 46*a* for the secured data 42 stored on the external system 16, as well as a second request 46*b* for the unsecured data 38 stored on the initial system 14. As shown in the flowchart of FIG. 4, there is a counterpart step 400 of receiving the transaction request 44.

These steps presuppose that the user 20 operating the client system 12 has already been authenticated to the initial system 14, and thus various embodiments of the present disclosure contemplate a preliminary authentication step 43. Those having ordinary skill in the art will recognize the various modalities by which such an authentication may proceed, but one of the most common is for the initial system 14 to prompt the user on the client system 12 for a username and password pair. The username is understood to correspond to and identify the first account 36. Provided that the user 20 can supply the correct password for the specified username, access to the remainder of the initial system 14 is granted. It is understood that the username and password challenge-response sequence is the most basic of the account safeguards/authentication that can be utilized, and more sophisticated though technically challenging solutions such as time-limited random passcodes delivered via an out of band modality can be substituted where such additional security measures are justified.

In accordance with the various contemplated embodiments, the communications between the client system 12, the initial system 14, as well as the external system 16 utilizes various eXtensible Markup Language (XML) service calls. An example service call for authentication purposes is shown in FIG. 6A. Within the "login-credentials" tags 47, there is one field defined by "username" tags 48 enclosing a username content (in the example, the username is "alex," the name of the booking consultant or the user 20 mentioned above). There is also another field defined by "password" tags 50 that enclose a password content (in the example, the password is "pass.") Although shown in plaintext, it is possible for the password content to be encrypted, beyond the transport-layer encryption provided by the TLS/SSL connection established between the client system 12 and the initial system 14. The use of XML service calls is by way of example only and not of limitation, and any other suitable inter-process communications may be used. Furthermore, the specific name assigned to each of the tags referenced herein is presented by way of example only and not of limitation. As will be recognized by those having ordinary skill in the art, XML tags can be freely defined, subject only to the limitations imposed by the parsing application.

In some embodiments, the transaction request 44 may not be segregated into the first request 46*a* and the second request 46*b*, but may be inherent therein. For example, upon authenticating the user 20, the client system 12 may transmit a conventional web request shown in FIG. 6B. As illustrated, only the host address for the initial system 14 and the particular requested page (creditinformation.html) may be included. The contents of the requested page, on the other hand, may further specify the first request 46*a* and the second request 46*b*. Accordingly, with reference to the flowchart of FIG. 4, the method continues with a step 402 of deriving from the transaction request 44 the first request 46*a* for the secured data 42 stored on the external system 16 and the second request 46*b* for the unsecured data 38 stored on the initial system 14.

Recognizing that the transaction request 44 includes the first request 46*a* for the secured data 42, the method continues with a step 404 of transmitting a token request 52 to the external system 16. With additional reference to the flowchart of FIG. 5, from the perspective of the external system 16, the step 404 has a corollary step of receiving the token request 52 from the initial system 14. The token request 52 is understood to correspond to the first request 46*a* for the secured data 42, and may also include authentication information necessary to login to the second account 40 on the external system 16. One exemplary embodiment of the token request 52 is shown in FIG. 6C, which includes fields delineated by "application-name" tags 55, "application-password" tags 56, and "dataset" tags 58. The "application-name" tags 55 and the "application-password" tags 56 are understood to be the aforementioned authentication information for logging in to the second account 40, while the "dataset" tags 58 are understood to identify the particular element of the secured data 42 that is specified in the first request 46*a*. The example value illustrated is "SavedWalletID1"

In response to receiving the token request 52, the external system 16 generates a token 54 per step 502. FIG. 6D shows an example token 54, also in the XML format, comprised of a string of alphanumeric characters. The token 54 is understood to be specific to the token request 52, as well as the first request 46*a* for the secured data 42. In some embodiments, the token 54 is intended to be for single use, and is generated for each token request 52, though in some cases it may be linked to a particular element of the secured data 42 when it is initially provided to the external system 16. Thus, as least some of the characters making up the token 54 may be randomly generated. If additional information is to be communicated, it could be encoded into token 54 as well. Upon being generated, the token 54 is transmitted to the initial system 14 in accordance with a step 504 for subsequent passing to the client system 12. As will be described in further detail below, the token 54 is eventually presented by the client system 12 to the external system 16 in order to retrieve the particular secured data 42 identified in the token request 52 (and hence the first request 46*a*). Accordingly, it is contemplated that the external system 16 locally maintains a table or other relational data structure that associates the token 54 to the corresponding token request 52 so that the proper, requested secured data 42 can be retrieved. Separately, or as part of such data structure, a log including the identity of the initial system 14 that originated such token request 52, along with the authentication information passed via the token request 52, may be recorded for subsequent audit purposes.

The transmissions of the token request 52 and the token 54 between the initial system 14 and the external system 16 is understood to take place over a trusted communication modality. The integrity of the data being passed from the external system 16 to the client system 12 thus depends in part on the integrity of this communications channel. Those having ordinary skill in the art will recognize the various available techniques of verifying the trust between the initial system 14 and the external system 16, as well as the communications link between the two systems.

From the standpoint of the initial system 14, the aforementioned step 504 has a complementary step 406 of receiving the token 54. Thereafter, in a step 408, the initial system 14 transmits the token and the requested unsecured data 38 to the client system 12. An example of the unsecured data 38 is shown in FIG. 6E. Continuing with the aforementioned example scenario of a booking consultant confirming the reservation of a customer, the dataset identifying that customer is included with "account-info" XML tags 59. Within those tags, there is a field delineated by "name" tags 60 that identifies the customer, as well as a field delineated by "booking-start-date" tags 61 and "booking-end-date" tags 62 that indicate, for example, the dates during which the customer John Smith will stay. There is additionally a placeholder for the requested secured data, which is delineated by "placeholder-for-wallet" tags 64. To maintain an auditable chain, the token 54 and the corresponding first request 46*a* that led to the generating of that token 54 may be stored in another audit log on the initial system 14.

In some embodiments, the client system 12 has no knowledge as to the location of the external system 16, and the external system 16, at the time of generating the token 54, likewise has no knowledge of the location or even the identity of the client system 12. Therefore, the initial system 14 may append a network address 66 of the external system 16 to the transmission to the client system 12. The client system 12 references the received network address 66 for subsequently accessing the secured data 42 stored thereon. To the extent the initial system 14 also does not have the network address 66 of the external system 16 readily available, it may be appended to the transmission of the token 54 from the external system 16.

Figures 6F, 6G, 7:
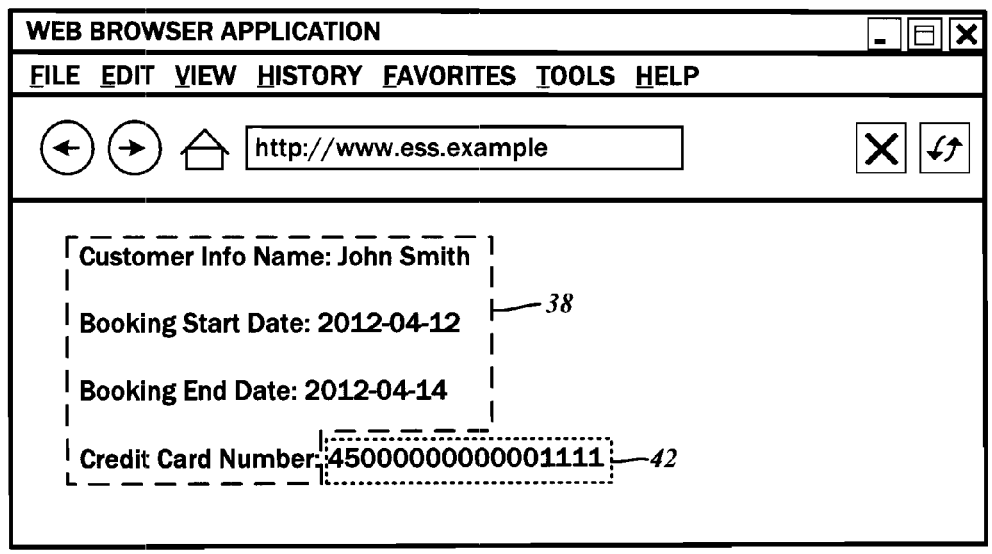

In order for the client system 12 to be able to access the external system 16, some embodiments contemplate a script 23 that is executable by the web browser application 22 and includes the aforementioned network address 66. An example of such a script is shown in FIG. 6F, which is coded in Javascript and includes certain XML service calls as shown. There are "account-request" tags 68, the structure and sub-elements of which correspond to that set forth in the "login-credentials" tags 47 discussed above. Again, there are similar "user" tags 70 that specify the identity of the holder of the first account 36, i.e., Alex, the booking consultant. In this embodiment, the token 54 may be included in the script/XML service call within "token" tags 72.

Referring back to the flowchart of FIG. 3, following the initial system 14 transmitting the token 54, the requested unsecured data 38, the network address 66 of the external system 16, and any of the other scripts and XML data mentioned above, such data is received by the client system 12 in accordance with step 302. To access the secured data 42, the token 54 is presented to the external system 16 for validation as well as the identification of the specific elements of the secured data 42 that pertains to the first request 46*a*. In this regard, the method includes a step 304 of transmitting the token 54 to the external system 16 for validation thereby, as well as a counterpart step 506 performed on the external system 16 of receiving an authentication request that includes the token 54. Since the included token 54 was generated in response to the first request 46*a*, the authentication request is related thereto. The data communications link between the client system 12 and the external system 16 is understood to be initiated by the client system 12 using the provided network address 66, and like the other data communications links mentioned previously, is secured in accordance with various techniques known in the art.

As indicated above, the token 54 includes an identifier of the specific elements of the secured data 42 that is being requested. Upon being presented with the token 54, the external system 16 retrieves or marshals the specified secured data 42 and transmits the same to the client system 12 in accordance with a step 508. To the extent the token 54 includes other authentication information, the external system 16 may conduct a validation process internally, and so long as that process is successful, proceed with the step 508 of transmitting the secured data 42. FIG. 6G shows an exemplary XML response of the specified secured data 42. In the illustrated example, the secured data 42 is a credit card number delineated by "credit-card-number" tags 75.

In an alternative embodiment, there may be an optional step of validating the received authentication request received from the client system 12 with the initial system 14. Where this optional step as performed, the authentication request may further include authentication credentials 74 such as username and password combinations that may be presented to login to the first account 36 and/or the second account 40. Upon validation of the authentication credentials 74 by the initial system 14, a validation confirmation 76 may be returned to external system 16. In response to receiving the validation confirmation 76, the external system 16 may transmit the specified secured data 42 in accordance with the manner described above.

The step 508 of transmitting the secured data 42 has a counterpart step 306 performed on the client system 12 of receiving the same. Following receipt, the secured data 42 may be presented to the user 20 on the client system 12. One embodiment of the present disclosure contemplates the aforementioned browser-executed script inserting the received secured data 42 in the placeholder included in the unsecured data 38. FIG. 7 shows an example display screen of the secured data 42 being displayed together with the unsecured data 38 in a single, unified interface. Thus, continuing with the example of the booking consultant, the user 20 is able to retrieve the booking information as well as the credit card number to which the booking will be billed.

As can be understood from the foregoing, the transmission of the secured data 42 completely bypasses the initial system 14, avoiding the need for compliance with the same security protocols as would govern the external system 16. In various contemplated embodiments, the external system 16 may be managed by a first entity, while the initial system 14 is managed by a second entity, thereby minimizing costs of compliance for the second entity. The external system 16 need not know the identity of the user 20 and the client system 12, while maintaining end-to-end trust. It is also possible for the initial system 14 to audit each of the requests that were made for the offsite, secured data 42 because of the logs that record each transaction request 44 along with its corresponding token 54 that was generated by the external system 16 in response.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method for limiting exposure of secured data in an authenticated transaction over multiple systems, the method comprising:

receiving a transaction request from an authenticated user of a client system on an initial system;

deriving from the transaction request a first request for the secured data stored on an external system independent of the initial system and a second request for unsecured data stored on the initial system, the first request and the second request being combined in the transaction request;

transmitting to the external system a token request corresponding to the first request for the secured data, the external system being configured to generate a token associated with the token request;

receiving on the initial system the generated token from the external system; and transmitting from the initial system to the client system the token and the requested unsecured data stored on the initial system;

wherein the token is presentable by the client system to the external system to retrieve the secured data stored on the external system independently of the transmission of the unsecured data upon validation of the token thereby by the external system.

2. The method of claim 1, further comprising:

transmitting a location identifier for the external system to the client system;

wherein the client system initiates a request for the secured data based upon the provided location identifier for the external system.

3. The method of claim 1, further comprising:

storing in an audit log on the initial system the token and the token request corresponding to the first request for the secured data.

4. The method of claim 1, further comprising:

establishing a secured trusted data communications link between the initial system and the external system.

5. The method of claim 1, further comprising:

establishing a secured trusted data communications link between the initial system and the client system.

6. The method of claim 1, wherein the requested unsecured data includes a placeholder for the requested secured data.

7. The method of claim 1, further comprising:

receiving a validation request from the external system generated in response to the client system presenting the token to the external system, the validation request including the token as received by the external system from the client system;

confirming the validation request; and transmitting a transaction validity response to the external system upon confirmation of the validation request.

8. The method of claim 1, wherein the token is single-use and newly generated for each token request.

9. The method of claim 1, wherein the user has a first account established on the initial system independently of the external system.

10. The method of claim 9, wherein the user has a second account established on the external system, the token being presentable by the client system to the external system upon authentication of the user to the second account, and the token request including an identifier of the second account.

11. An article of manufacture comprising a non-transitory program storage medium readable by a computer, the medium tangibly embodying one or more programs of instructions executable by the computer to perform a method for limiting exposure of secured data in an authenticated transaction over multiple systems, the method comprising:

receiving a transaction request from an authenticated user of a client system on an initial system;

deriving from the transaction request a first request for the secured data stored on an external system independent of the initial system and a second request for unsecured data stored on the initial system, the first request and the second request being combined in the transaction request;

transmitting to the external system a token request corresponding to the first request for the secured data, the external system being configured to generate a token associated with the token request;

receiving on the initial system the generated token from the external system; and transmitting from the initial system to the client system the token and the requested unsecured data stored on the initial system;

wherein the token is presentable by the client system to the external system to retrieve the secured data stored on the external system independently of the transmission of the unsecured data upon validation of the token by the external system.

* * * * *